UNITED STATES PATENT OFFICE 2,321,332

N-(P-AMINO AND ACYL-P-AMINOARYLSUL-PHONYLAMIDO)-PYRIDINE - CARBOXYLIC ACIDS AND THERMAL DECOMPOSITION PRODUCT THEREOF

Lester J. Szabo, Cleveland, Ohio, assignor to S. M. A. Corporation, Chicago, Ill., a corporation of New Jersey No Drawing. Application July 15, 1940, Serial No. 345,624

5 Claims. (Cl. 260—296)

This invention relates to improvements in N-(p-amino and acyl-p-aminoarylsulphonylamido)-pyridine-carboxylic acids and thermal decomposition product thereof.

The use of sulphapyridine and its derivatives is becoming increasingly important in the treatment of infections of the coccus type.

I have discovered that certain compounds when subjected to hydrolysis, decarboxylation and purification will result in sulphapyridine and certain derivatives.

These compounds are generally aminobenzenesulphonylamido pyridine carboxylic acids and acetylsulphapyridine carboxylic acids of the general formula ARX wherein A is the acid, R may be H, acetyl, pyridine, carboxyl, propionyl, butyryl, valeryl or the like and

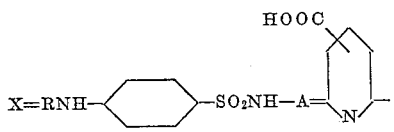

as shown by the following, wherein the primed numbers (2'-3' etc.) indicate the pyridine ring in order to differentiate between groups and wherein R exists in those containing more than one amino group.

The compound 2-(p-amino-benzenesulphonylamido)-pyridine-3'-carboxylic acid or sulphapyridine-3'-carboxylic acid,

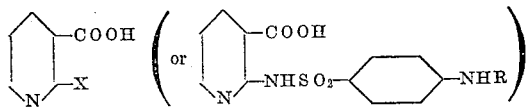

and the compound 2'-(p-aminobenzenesulphonylamido-)-pyridine-4'-carboxylic acid

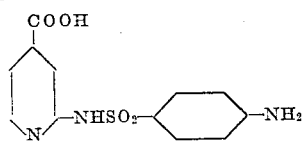

and the compound

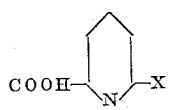

sulphapyridine-6'-carboxylic acid may be utilized in accordance with my invention, as follows:

1 mol. of the appropriate aminopyridine-carboxylic acid is treated with 1 mol. of acetyl-sulphanilyl chloride in a solution 2.3 mols. of sodium bicarbonate in about 800 ml. of water (a portion of the water may be replaced by a water soluble solvent such as acetone or dioxan). The acid chloride gradually goes into solution. After allowing to stand a short time and carefully acidifying a white solid separates and is filtered off, washed with water and acetone and dried. This compound is the acetyl amino benzene sulphonyl derivative.

4.2 grams of acetylsulphanilyl chloride is added to a solution consisting of 2.5 grams of 2-aminopyridine-3-carboxylic acid and 1.5 grams of sodium bicarbonate (or other alkalizing agent) in 50 ml. of water. The acid chloride gradually goes into solution and is allowed to stand about one hour. The solution is acidified (acid to litmus paper) and a white solid separates out. This is filtered off, washed with water, and acetone and dried.

The acetylaminobenzenesulphonylamido-pyridine carboxylic acid obtained as above is dissolved in an excess of hot dilute (4 or 5 normal) hydrochloric acid and refluxed for about 1 hour after which the solution is concentrated by boiling and cooled. A slight excess of saturated sodium acetate solution is then added to combine with the hydrochloric acid and the mixture placed in the refrigerator. Colorless crystals separate which are filtered off, washed with water and alcohol and dried. The resulting products are generally slightly soluble in water, very slightly soluble in acetone, alcohol and ether. Most of these compounds are high melting.

5 grams of $2^1$-(p-acetylaminobenzene-sulphonylamido)-pyridine-3-carboxylic acid is refluxed about ½ to 1 hour with 10 ml. of 4 normal hydrochloric acid. The solution is then concentrated to remove excess hydrochloric acid and diluted to about 15-20 ml. with water. A concentrated solution of sodium acetate is then added to bind the hydrochloric acid and allowed to stand until crystallization is complete. The mixture is filtered and the solids washed and dried. Colorless, crystalline plates are obtained which on heating chip into needles at about 200° C. and does not melt at 270° C. When the above compounds are decarboxylated, they are converted to p - aminobenzene - sulphonylamidopyridine. This may be accomplished in a number of ways; for example, by heating alone or in the presence of high boiling non-reactive liquid which may be of neutral or basic character such as mineral oil or quinoline or the like. This same result may also be accomplished, more readily than heating alone, by heating with a basic oxide or a mixture thereof, such as lime or soda-lime (a mixture of calcium oxide or hydroxide and sodium hydroxide).

When the reaction is completed the desired compound is recovered by suitable means. As an example, any of the compounds obtained as in the second-step above, are intimately mixed with two to four equivalents of soda-lime and heating the mixture, suitably above 200° C. until the reaction is complete (the exact time and temperature are dependent upon the individual compound being treated). The reaction product is then treated with dilute acetic acid to an acid reaction (a slight excess over that required to completely dissolve the inorganic solids) and filtering off the desired compound. This may then be purified by crystallization from a suitable solvent, generally water.

The end product in this process when using 2-aminopyridine-3-carboxylic acid or the 4- or 6-carboxylic acids followed by hydrolysis, decarboxylation by heat and purification is sulphapyridine and would of necessity act therapeutically the same as sulphapyridine obtained by other methods.

What I claim is:

1. The process of preparing sulphapyridine which comprises decarboxylating a 2-sulphapyridine in which the pyridine nucleus is substituted by a carboxyl group of the group sulphapyridine 3' carboxylic acid, sulphapyridine 4' carboxylic acid and sulphapyridine 6' carboxylic acid by heat in the presence of a high boiling nonreactive neutral liquid.

2. The process of preparing sulphapyridine which comprises decarboxylating a 2-sulphapyridine in which the pyridine nucleus is substituted by a carboxyl group of the group sulphapyridine 3' carboxylic acid, sulphapyridine 4' carboxylic acid and sulphapyridine 6' carboxylic acid by heat in the presence of mineral oil.

3. The process of preparing sulphapyridine which comprises decarboxylating a 2-sulphapyridine in which the pyridine nucleus is substituted by a carboxyl group of the group sulphapyridine 3' carboxylic acid, sulphapyridine 4' carboxylic acid and sulphapyridine 6' carboxylic acid by heat in the presence of a quinoline.

4. The process of preparing 2-sulphapyridine which comprises decarboxylating a compound of the group consisting of sulphapyridine 3' carboxylic acid, sulphapyridine 4' carboxylic acid, and sulphapyridine 6' carboxylic acid in the dry state by heat.

5. The process of claim 4 and in which the carboxylic acid is heated in the dry state in the presence of a basic oxide.

LESTER J. SZABO.